United States Patent
Shoji et al.

(10) Patent No.: US 7,965,593 B2
(45) Date of Patent: *Jun. 21, 2011

(54) INFORMATION RECORDING MEDIUM, INTEGRATED CIRCUIT, RECORDING/PLAYBACK APPARATUS, COMPUTER PROGRAM, AND INFORMATION RECORDING/PLAYBACK METHOD

(75) Inventors: Mamoru Shoji, Osaka (JP); Takashi Ishida, Kyoto (JP); Kohei Nakata, Osaka (JP)

(73) Assignee: Panasonic Corporation, Osaka (JP)

( * ) Notice: Subject to any disclaimer, the term of this patent is extended or adjusted under 35 U.S.C. 154(b) by 164 days.

This patent is subject to a terminal disclaimer.

(21) Appl. No.: 12/121,271

(22) Filed: May 15, 2008

(65) Prior Publication Data

US 2008/0225683 A1 Sep. 18, 2008

Related U.S. Application Data

(62) Division of application No. 11/547,398, filed as application No. PCT/JP2005/012453 on Jul. 6, 2005.

(30) Foreign Application Priority Data

Jul. 12, 2004 (JP) .................................. 2004-205252

(51) Int. Cl.
*G11B 7/00* (2006.01)

(52) U.S. Cl. ................................. 369/44.29; 369/44.26

(58) Field of Classification Search ............... 369/44.26, 369/44.29

See application file for complete search history.

(56) References Cited

U.S. PATENT DOCUMENTS

| | | | |
|---|---|---|---|
| 5,745,475 A * | 4/1998 | Ohno et al. ................ | 369/275.4 |
| 6,538,963 B1 | 3/2003 | Fukada | |
| 6,667,949 B2 | 12/2003 | Stek et al. | |
| 7,123,574 B2 | 10/2006 | Shoji et al. | |
| 2003/0202436 A1 | 10/2003 | Tomita et al. | |
| 2005/0058056 A1 | 3/2005 | Heemskerk et al. | |
| 2005/0169136 A1* | 8/2005 | Nagata et al. ............. | 369/47.27 |
| 2005/0190674 A1 | 9/2005 | Lee et al. | |
| 2005/0213483 A1 | 9/2005 | Tomita et al. | |

(Continued)

FOREIGN PATENT DOCUMENTS

EP 1 569 210 A2 8/2005

(Continued)

OTHER PUBLICATIONS

European Search Report issued Mar. 3, 2009 in European Application No. 05 75 7966.

(Continued)

*Primary Examiner* — Van N Chow
(74) *Attorney, Agent, or Firm* — Wenderoth, Lind & Ponack, L.L.P.

(57) ABSTRACT

An optical disk 101 in which information is recorded on a groove track, and an optical disk 107 in which information is recorded on a land track. The optical disk 101 has a control data area 102, and a data recording area 103 in which user data is recorded. The optical disk 107 has a control data area 108, and a data recording area 109 in which user data is recorded. A code for indicating the groove track or the land track onto which a tracking servo control is to be executed is provided both in the control data area 102 of the optical disk 101, and in the control data area 108 of the optical disk 107.

2 Claims, 13 Drawing Sheets

U.S. PATENT DOCUMENTS

| | | |
|---|---|---|
| 2007/0291628 A1 | 12/2007 | Abe et al. |
| 2008/0219110 A1 | 9/2008 | Abe et al. |
| 2008/0219139 A1 | 9/2008 | Abe et al. |
| 2008/0219140 A1 | 9/2008 | Abe et al. |
| 2008/0225682 A1 | 9/2008 | Abe et al. |

FOREIGN PATENT DOCUMENTS

| | | |
|---|---|---|
| EP | 1 577 884 | 9/2005 |
| JP | 10-312547 | 11/1998 |
| JP | 2001-167454 | 6/2001 |
| JP | 2003-109246 | 4/2003 |
| JP | 2003-115114 | 4/2003 |
| JP | 2003-123320 | 4/2003 |
| JP | 2003-517171 | 5/2003 |
| JP | 2003-223722 | 8/2003 |
| JP | 2004-30860 | 1/2004 |
| JP | 2007-537555 | 12/2007 |
| WO | 01/80227 | 10/2001 |
| WO | 2004/055790 | 7/2004 |
| WO | 2005/109414 | 11/2005 |

OTHER PUBLICATIONS

International Search Report issued Sep. 27, 2005 in International (PCT) Application No. PCT/JP2005/012453.

Japanese Office Action issued Jul. 22, 2008 in connection with Japanese Patent Application No. 2005-515393 corresponding to the present U.S. application.

Office Action mailed May 25, 2010 issued in corresponding Japanese Patent Application No. 2008-287567 with English translation.

European Search Report dated Jul. 23, 2010 issued in EP Application No. 10166474.

* cited by examiner

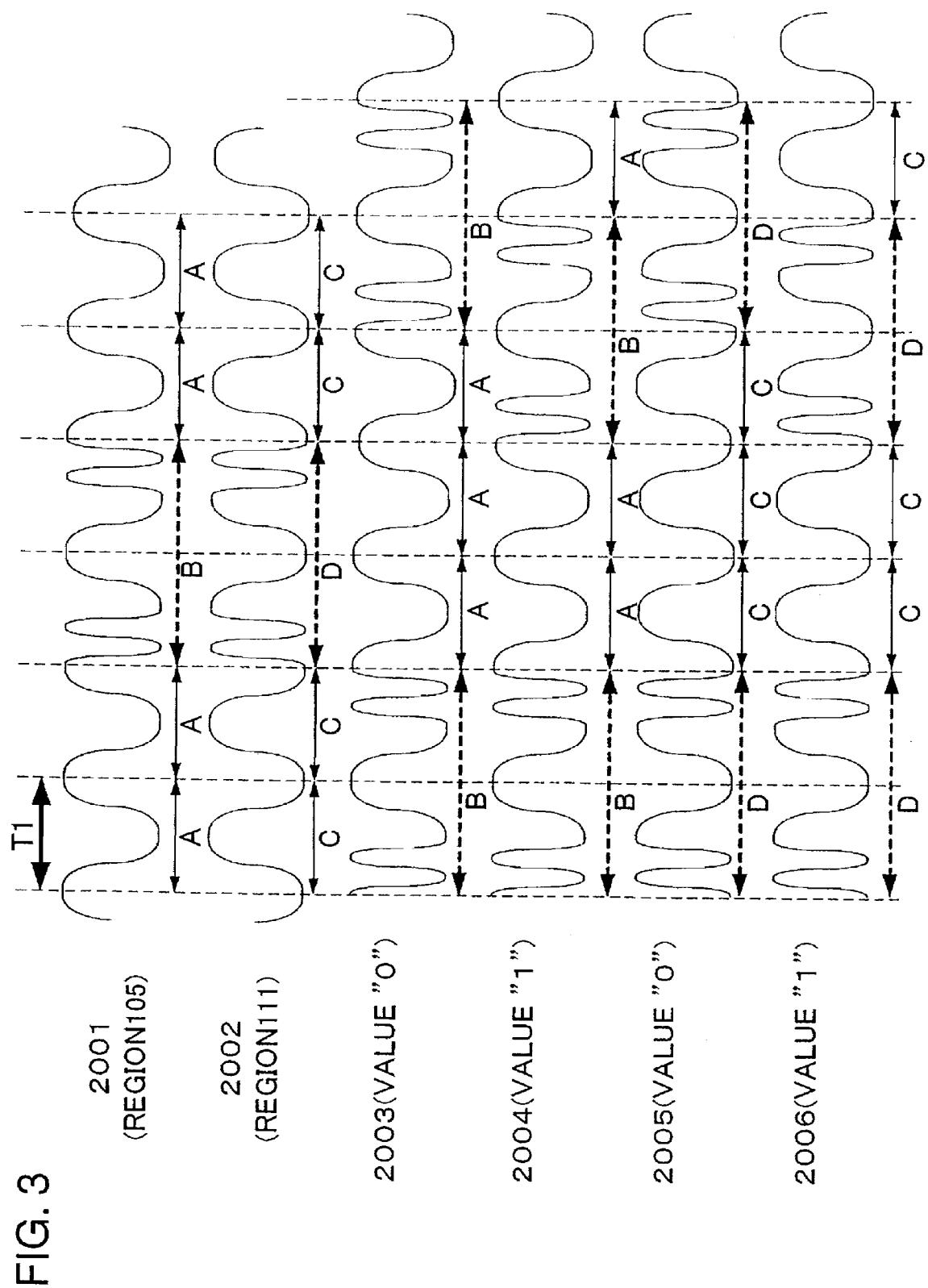

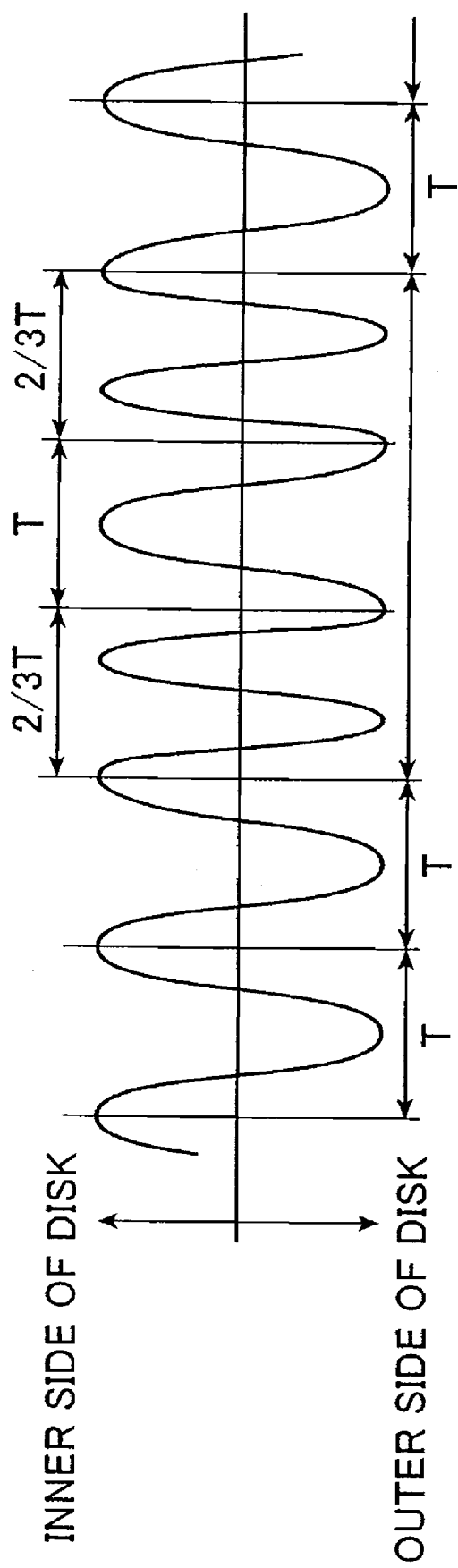

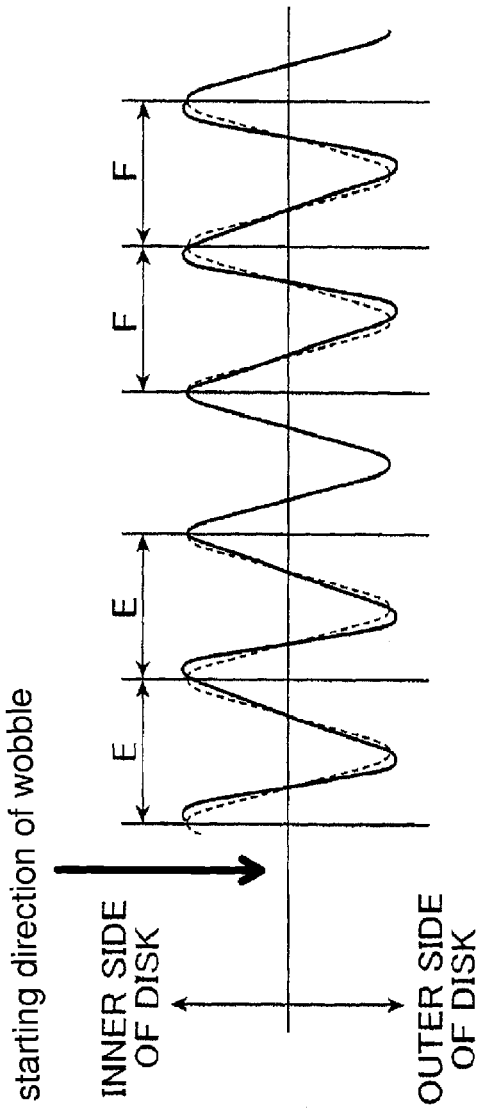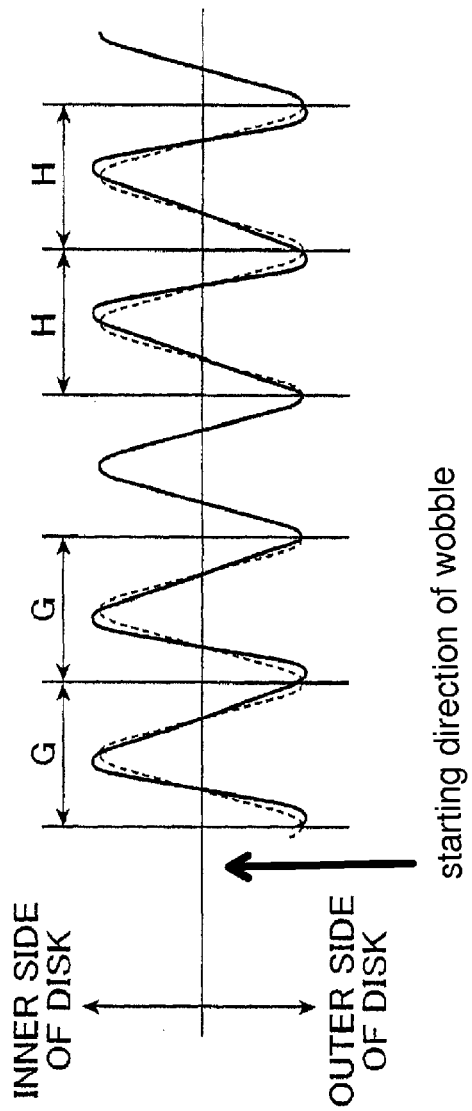

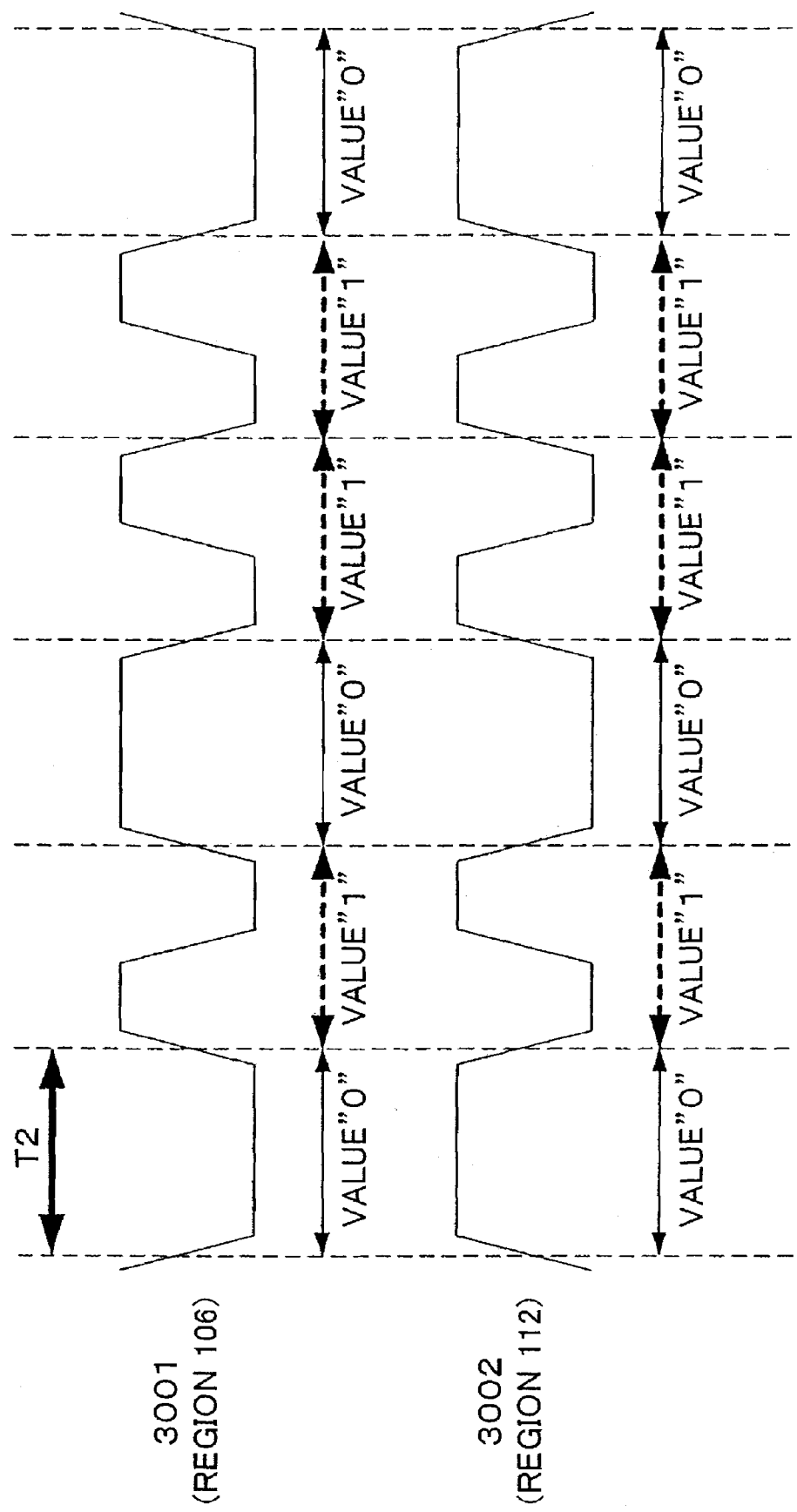

INFORMATION RECORDING MEDIUM, INTEGRATED CIRCUIT, RECORDING/PLAYBACK APPARATUS, COMPUTER PROGRAM, AND INFORMATION RECORDING/PLAYBACK METHOD

This application is a Divisional of application Ser. No. 11/547,398 filed Oct. 2, 2006, which is the National Stage of International Application No. PCT/JP2005/012453, filed Jul. 6, 2005.

TECHNICAL FIELD

The present invention relates to a technology of determining a tracking polarity in playback of optical information recorded in an information recording medium.

BACKGROUND ART

In recent years, research and development on high-density optical disks have been active, and DVD has been commercially available. Thus, the optical disks have been establishing their positions as important information recording media. Conventionally, development on DVD exclusively for playback use has been active among a variety of DVD standards. However, as DVD recorders are spread, development on recordable DVD has been progressed. Further, a recent trend proposes a Blu-ray rewritable disk (BD-RE) as a result of pursuing further high-density optical disks. Thus, the BD-RE has also been available, and used in recording of digital broadcasting contents or the like.

There are known two methods of forming a recording layer in an information recordable optical disk, namely, vapor deposition and spin coating, as disclosed in Japanese Unexamined Patent Publication No. 2003-109246, for instance. These two recording layer forming methods are described referring to FIGS. 13A and 13B.

FIG. 13A and 13B are cross-sectional views each showing an optical disk. FIG. 13A shows an example of a BD-RE, wherein a recording layer made of a phase change material is formed by vapor deposition. FIG. 13B shows an example of a DVD-R, wherein a recording layer made of an organic-pigment-based material is formed by spin-coating.

As shown in FIG. 13A, the BD-RE is produced by forming a reflecting layer 502 on an injection-molded base member 501 by sputtering or a like technique, forming a recording layer 503 on the reflecting layer 502 by vapor deposition, and attaching a sheet member 505 to the recording layer 503 with an adhesive layer 504 being formed between the recording layer 503 and the sheet member 505. Assuming that a portion of an asperity on each layer including the base member 501, which is formed on the side of the disk where an optical pickup device for emitting laser light is arranged, is called as a "groove track", and a portion of the asperity on each layer, which is formed on the side of the disk opposite to the side where the optical pickup device is arranged, is called as a "land track", information is recorded on the groove track.

As shown in FIG. 13B, a base member 506 and a base member 510 each produced by injection molding are attached to each other via an adhesive layer 509 by spin-coating. Prior to the attachment of the base members 506 and 510, a recording layer 507 is formed on the base member 506 by spin-coating, and a reflecting layer 508 is formed on the recording layer 507 by sputtering or a like technique. Similarly to the disk as shown in FIG. 13A, assuming that a portion of an asperity on the base member 506, which is formed on the side of the disk where an optical pickup device for emitting laser light is arranged, is called as a "groove track", and a portion of the asperity on the base member 506, which is formed on the side of the disk opposite to the side where the optical pickup device is arranged, is called as a "land track", information is recorded in the groove track.

To realize high-density recording in the BD-RE as shown in FIG. 13A, laser light of a shorter wavelength than the one used for an ordinary DVD is used, and an objective lens having a high numerical aperture (NA) is used. In view of this, in the BD-RE as shown in FIG. 13A, laser light is emitted from the side of the sheet member 505 having a smaller thickness than the base member 501, in place of being emitted from the side of the base member 506, as in the DVD-R having the asperity pattern as shown in FIG. 13B.

The spin-coating technique is advantageous in shortening the time required for forming a recording layer. Applying this technique in producing a BD may result in a construction as shown in FIG. 13C. Specifically, as shown in FIG. 13C, a BD is produced by forming a reflecting layer 512 on an injection-molded base member 511 by sputtering or a like technique, forming a recording layer 513 on the reflecting layer 512 by spin-coating, and attaching a sheet member 515 to the recording layer 513, with an adhesive layer 514 being formed between the recording layer 513 and the sheet member 515. In the BD as shown in FIG. 13C, assuming that a portion of an asperity on each layer including the base member 511, which is formed on the side of the disk where an optical pickup device for emitting laser light is arranged, is called as a "groove track", and a portion of the asperity on each layer, which is formed on the side of the disk opposite to the side where the optical pickup device is arranged, is called as a "land track", it is desirable to record information on the land track.

In other words, since the recording layer 513 is required to have a certain thickness, the recording layer 513 is required to have a large thickness as shown in FIG. 13D if information is to be recorded on the groove track, with the result that a material cost of the disk as shown in FIG. 13D is increased, as compared with the disk as shown in FIG. 13C.

A BD-RE of a type in which information is recorded on a groove track, as shown in FIG. 13A, is well known. Under the circumstances that there are two types of disks, wherein one type of disk is such that information is recorded on a groove track, and the other type of disk is such that information is recorded on a land track, a recording/playback apparatus has difficulty in readily judging whether the disk is of a type having a configuration that information has been or is to be recorded on the land track or on the groove track, with the result that it takes a certain time to start up the recording/playback apparatus.

BRIEF SUMMARY OF THE INVENTION

In view of the above problems residing in the prior art, an object of the invention is to provide an information recording medium such as a disk that enable to suppress the time required for startup of a recording/playback apparatus from unduly increasing in case of information recording or information playback in or out of a disk constructed such that information is to be or has been recorded in a groove track, and a disk constructed such that information is to be or has been recorded in a land track.

To accomplish the above object, an aspect of the invention is directed to an information recording medium comprising a data recording area and a control data area, and having a construction that information is recorded on a groove track or on a land track of a recording layer of the data recording area and the control area, wherein the information recording medium has a code for indicating the groove track or the land track onto which tracking servo control is executed.

The above arrangement enables to promptly determine whether the tracking servo control is executed onto the groove track or onto the land track when the information recording medium is loaded in a recording/playback apparatus, thereby keeping the time required for startup of the apparatus from unduly increasing.

BRIEF DESCRIPTION OF THE DRAWINGS

FIG. 3 is a plan view schematically and enlargedly showing tracks in a data recording area of an optical disk embodying the invention.

FIG. 4 is an illustration for explaining an altered wobbling pattern of an optical disk embodying the invention.

FIGS. 5A and 5B are illustrations for explaining altered wobbling patterns of an optical disk embodying the invention.

FIG. 6 is a plan view schematically and enlargedly showing tracks in a control data area of an optical disk embodying the invention.

BEST NODE FOR CARRYING OUT THE INVENTION

Figure 1A:
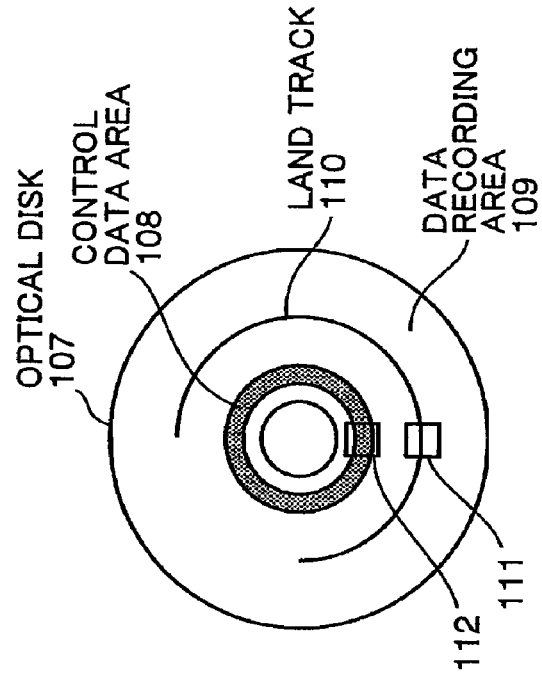
FIG. 1A is a plan view of an optical disk as an example of an information recording medium embodying the invention.
Figure 1B:
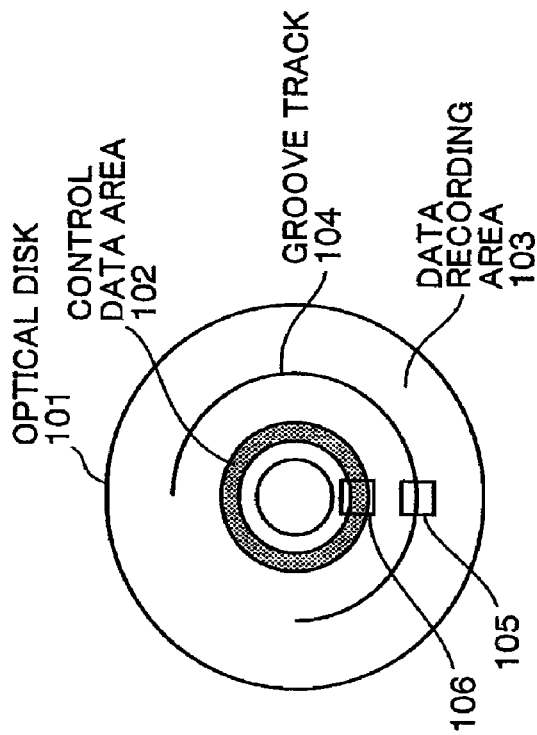
FIG. 1B is a plan view of an optical disk as another example of the information recording medium embodying the invention.
Figure 1C:
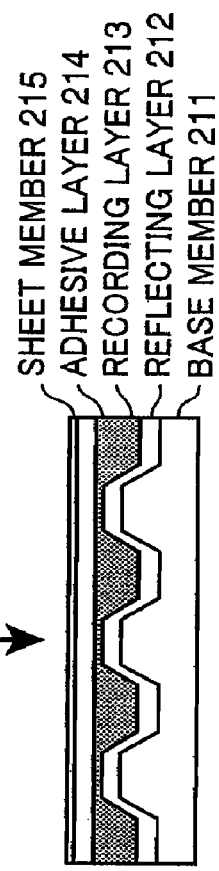
FIG. 1C is a cross-sectional view of the optical disk shown in FIG. 1A.
Figure 1D:
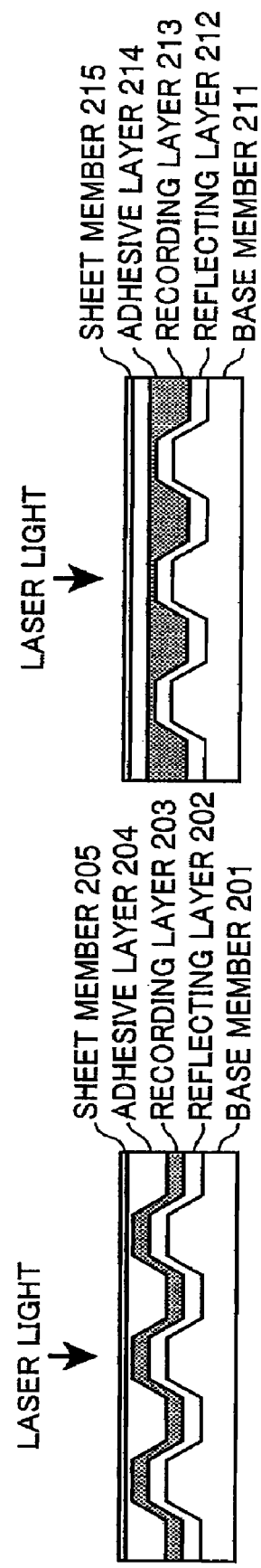
FIG. 1D is a cross-sectional view of the optical disk shown in FIG. 1B.

In the following, preferred embodiments of the invention are described referring to the drawings. FIGS. 1A and 1B respectively show an optical disk 101 and an optical disk 107 as examples of an information recording medium embodying the invention. FIG. 1A and FIG. 1C each shows the optical disk 101 of a recordable type constructed such that information is recorded on a groove track. FIG. 1A is a plan view, and FIG. 1C is a cross-sectional view as viewed from a circumferential direction of the optical disk 101. An example of the optical disk 101 is a BD-RE. FIG. 1B and FIG. 1D each shows the optical disk 107 of a recordable type constructed such that information is recorded on a land track. FIG. 1B is a plan view, and FIG. 1D is a cross-sectional view as viewed from a circumferential direction of the optical disk 107. An example of the optical disk 107 is a DVD-R. The track may be concentrically formed or spirally formed.

As shown in FIG. 1A, the optical disk 101 has a control data area 102, and a data recording area 103 which is provided on a radially outer region relative to the control data area 102. The radius of the control data area 102 is defined by the disk standard, and information such as administration data relating to administration of the disk has been pre-recorded in the control data area 102. The radius of the data recording area 103 is also defined by the disk standard. The data recording area 103 is an area in which data is recorded by a user.

The optical disk 101 shown in FIG. 1A has a layer construction such that a base member 201, a reflecting layer 202, a recording layer 203, an adhesive layer 204, and a sheet member 205 are formed one over the other in this order, as shown in FIG. 1C. The optical disk 101 is produced by forming the reflecting layer 202 on the injection-molded base member 201 by sputtering or a like technique, forming the recording layer 203 on the reflecting layer 202 by vapor deposition, and attaching the sheet member 205 to the recording layer 203, with the adhesive layer 204 being formed between the recording layer 203 and the sheet member 205. Thus, the optical disk 101 is produced.

Figure 2A:
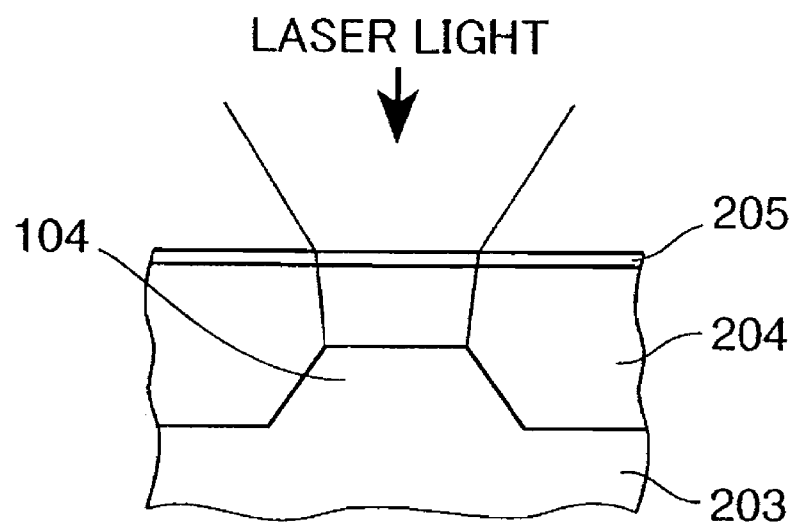
FIG. 2A is a cross-sectional view partially showing an optical disk constructed such that information is recorded on a groove track.

Asperities are formed on the base member 201. Likewise, asperities are formed on the recording layer 203 in accordance with the asperity pattern on the base member 201. Assuming that a portion of an asperity on each layer including the base member 201, which is formed on the side of the optical disk 101 where an optical pickup device for emitting laser light is arranged, is called as a "groove track", and a portion of the asperity on each layer, which is formed on the side of the optical disk 101 opposite to the side where the optical pickup device is arranged, is called as a "and track", information is recorded on a groove track 104 of the recording layer 203, as shown in FIG. 2A.

As shown in FIG. 1B, the optical disk 107 has a control data area 108, and a data recording area 109 which is provided on a radially outer region relative to the control data area 108. The radius of the control data area 108 is defined by the disk standard, and data such as administration data relating to administration of the disk has been pre-recorded in the control data area 108. The radius of the data recording area 109 is also defined by the disk standard. The data recording area 109 is an area in which data is recorded by a user.

The optical disk 107 shown in FIG. 1B has a layer construction such that a base member 211, a reflecting layer 212, a recording layer 213, an adhesive layer 214, and a sheet member 215 are formed one over the other in this order, as shown in FIG. 1D. The optical disk 107 is produced by forming the reflecting layer 212 on the injection-molded base member 211 by sputtering or a like technique, forming the recording layer 213 on the reflecting layer 212 by spin-coating, and attaching the sheet member 215 to the recording layer 213, with the adhesive layer 214 being formed between the recording layer 213 and the sheet member 215. Thus, the optical disk 107 is produced.

Figure 2B:
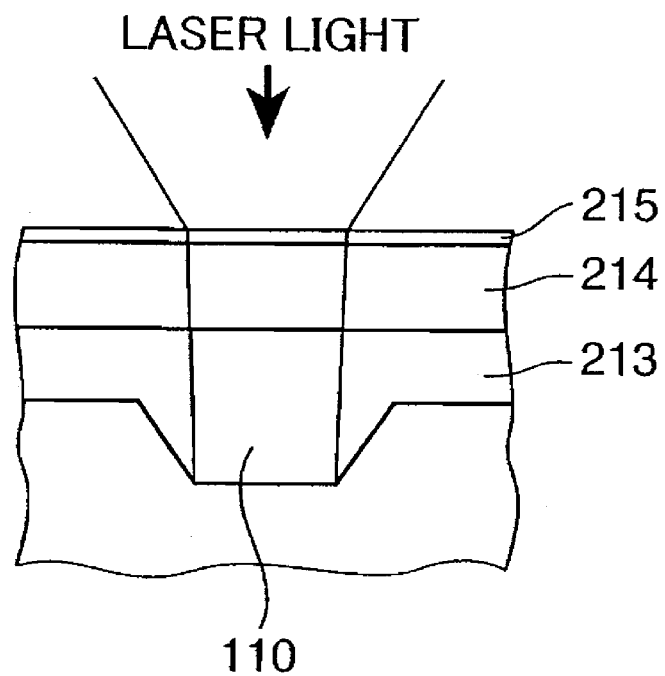
FIG. 2B is a cross-sectional view partially showing an optical disk constructed such that information is recorded on a land track.

Asperities are formed on the base member 211. Likewise, asperities are formed on the lower surface of the recording layer 213 in accordance with the asperity pattern of the base member 211. In other words, the optical disk 107 is constructed in such a manner that a small thickness portion and a large thickness portion of the recording layer 213 are alternately formed in a radial direction of the disk. Assuming that a portion of an asperity on each layer including the base member 211, which is formed on the side of the optical disk 107 where an optical pickup device for emitting laser light is arranged, is called as a "groove track", and a portion of the asperity on each layer, which is formed on the side of the optical disk 107 opposite to the side where the optical pickup device is arranged, is called as a "land track", information is recorded on a land track 110 of the recording layer 213, as shown in FIG. 2B.

The optical disk 107 has the arrangement that the recording layer 213 is formed by spin-coating, and that information is recorded on the land track 110. This arrangement enables to shorten the time required for forming the recording layer 213, to perform stable information recording, and to keep the material cost of the optical disk from unduly increasing.

Next, the embodiment of the invention is described referring to FIG. 3. Denoted by the reference numeral 2001 in the uppermost section of FIG. 3 is an enlarged illustration of a region 105 (see FIG. 1A) of the groove track 104 of the data recording area 103 in a track direction of the optical disk 101. Likewise, denoted by the reference numeral 2002 in FIG. 3 is an enlarged illustration of a region 111 (see FIG. 1B) of the land track 110 of the data recording area 109 in a track direction of the optical disk 107. As shown by the patterns 2001 and 2002, the groove track 104 and the land track 110 are wobbled, and information such as a sync pattern, address information, and information relating to a start timing of recording user data is recorded in the format of the wobbling pattern.

Let's assume that the same information (e.g., address information) has been recorded on the groove track 104 of the optical disk 101 and in the land track 110 of the optical disk 107. Then, as shown FIG. 3, the wobbling pattern 2001 of the groove track 104 in the optical disk 101, and the wobbling pattern 2002 of the land track 110 in the optical disk 107 are different from each other by 180 degrees in phase. In other words, the wobbling directions of tracks are opposite to each other with respect to the direction of playback between an information recording medium constructed such that data is recorded on a groove track, and an information recording medium constructed such that data is recorded on a land track.

Differential signals to be detected are inverted between a case of emitting laser light onto a groove track, and a case of emitting laser light onto a land track. In view of this, by making the wobbling direction of the groove track 104 in the optical disk 101, and the wobbling direction of the land track 110 in the optical disk 107 opposite to each other, the polarity of a differential signal to be detected in playback of data from the groove track 104 in the optical disk 101, and the polarity of a differential signal to be detected in playback of data from the land track 110 in the optical disk 107 can be made coincident with each other. In this arrangement, even with use of a recording/playback apparatus which is merely compatible with an optical disk having a configuration that information is recorded on a groove track such as the optical disk 101, an address of an optical disk having a configuration that information is recorded on a land track such as the optical disk 107 can be detected in accordance with the same sequence as the optical disk 101, as far as tracking servo control is executable onto the land track. The differential signal means a difference in output signals from two light receiving areas of a photo-detector in the case where reflected light from the optical disk has been received on the photo-detector, wherein the two light receiving areas are obtained by dividing the light receiving plane of the photo-detector into two halved parts along an imaginary line parallel with a tangential line of the track direction.

As shown in FIG. 3, the wobbling pattern 2001 in the region 105 of the groove track 104 is constituted of patterns A and patterns B. The pattern B wobbles with a frequency 1.5 times as high as the frequency of the pattern A. The pattern B appears between the two adjacent patterns A. Likewise, the wobbling pattern 2002 in the region 111 of the groove track 110 is constituted of patterns C and patterns D. The pattern D wobbles with a frequency 1.5 times as high as the frequency of the pattern C. The pattern D appears between the two adjacent patterns C. Whereas the wobbling pattern 2001 in the region 105 and the wobbling pattern 2002 in the region 111 are different from each other by 180 degrees in phase, the frequencies of the pattern A and the pattern C are identical to each other, and a frequency component included in the pattern B is the same as a frequency component included in the pattern D.

Address information and the like are recorded on the groove track 104 of the optical disk 101 with use of the pattern A and the pattern B. For instance, a pattern arrangement such as the wobbling pattern 2003, which is constituted of the pattern B, followed by appearance of the pattern A three times, and then the pattern B, is defined as a value "0", and a pattern arrangement such as the wobbling pattern 2004, which is constituted of the pattern B, followed by appearance of the pattern A two times, and then the pattern B, is defined as a value "1". In this way, address information and the like are constituted of a combination of the values "0" and "1".

Likewise, address information and the like are recorded on the land track 110 in the optical disk 107 with use of the pattern C and the pattern D. For instance, a pattern arrangement such as the wobbling pattern 2005, which is constituted of the pattern D, followed by appearance of the pattern C three times, and then the pattern D, is defined as a value "0", and a pattern arrangement such as the wobbling pattern 2006, which is constituted of the pattern D, followed by appearance of the pattern C two times, and then the pattern D, is defined as a value "1".

Regarding the groove track 104, the time required for detecting a succeeding pattern B after detection of a preceding pattern B is shorter in the wobbling pattern 2004 identified by the value "1", than in the wobbling pattern 2003 identified by the value "0". Also, regarding the land track 110, the time required for detecting a succeeding pattern D after detection of a preceding pattern D is shorter in the wobbling pattern 2006 identified by the value "1" than in the wobbling pattern 2005 identified by the value "0". Furthermore, as mentioned above, since the frequencies of the pattern A and the pattern C are identical to each other, and the frequency components included in the pattern B and in the pattern D are the same, the following idea is proposed. If a playback apparatus is capable of detecting the pattern B and the pattern D, the playback apparatus can detect the value "0" based on the wobbling patterns 2003 and 2005, and can detect the value "1" based on the wobbling patterns 2004 and 2006, regardless of the polarity of the detected differential signal. In this way, the playback apparatus can detect information constituted of the combination of the values "0" and "1".

As far as the wobbling pattern in the groove track 104 and the wobbling pattern in the land track 110 are different from each other by 180 degrees in phase, the wobbling pattern may include a pattern other than the patterns A through D. Further alternatively, the wobbling pattern in the groove track (land track) may be constituted of a combination of two or more patterns.

As far as a time lag in appearance of predetermined patterns can be detected by utilizing the values "0" and "1", the manner of defining the values "0" and "1" is not limited to the foregoing.

Further, as far as information detected from the groove track 104 of the optical disk 101 can be detected from the land track 110 of the optical disk 107 in the case where the same information is recorded on the groove track 104 and on the land track 110, the manner of changing the pattern of the track, and the manner of defining the values "0" and "1" are not specifically limited to the foregoing.

For instance, as shown in FIG. 4, it is possible to adopt a wobbling pattern, wherein a pattern corresponding to a predetermined number of cycles of time, e.g., 3 cycles of time is wobbled with respect to a monotonous reference waveform. In the example of FIG. 4, the first cycle of time, and the third cycle of time are ⅔ times as long as the cycle T of time of the reference waveform, and the second cycle of time is the same as the cycle T of time of the reference waveform. In such an altered arrangement, the wobbling directions may be made opposite to each other between an optical disk having a configuration that information is recorded on a groove track, and an optical disk having a configuration that information is recorded on a land track.

Further alternatively, it is possible to adopt wobbling patterns as shown in FIGS. 5A and 5B, wherein a saw-tooth waveform is used in place of a monotonous reference waveform such as a sinusoidal waveform. A saw-tooth waveform is obtained by combination of a sine wave and a cosine wave, for instance. As shown in FIG. 5A, it is possible to make a pattern E, wherein the peak point of the pattern E is displaced in a backward direction in time relative to the peak point of a reference waveform at the time of playback by adding a sine wave to a cosine wave, and to define the pattern E as the value "1". Likewise, as shown in FIG. 5A, it is possible to make a pattern F, wherein the peak point of the pattern F is displaced in a forward direction in time relative to the peak point of the reference waveform at the time of playback by subtracting a sine wave from a cosine wave, and to define the pattern F as the value "0". In this way, the wobbling pattern as shown in FIG. 5A is obtained by combination of the pattern E and the pattern F. On the other hand, the wobbling direction (e.g., starting direction of wobble with respect to reproduction direction) of the wobbling pattern as shown in FIG. 5B is opposite to the wobbling direction of the wobbling pattern as shown in FIG. 5A. Specifically, the wobbling pattern as shown in FIG. 5B is constituted of a pattern G corresponding to the pattern E, and a pattern H corresponding to the pattern F. The wobbling pattern as shown in FIG. 5A may be adopted in an optical disk having a configuration that information is recorded on a groove track, and the wobbling pattern as shown in FIG. 5B may be adopted in an optical disk having a configuration that information is recorded on a land track to thereby make the wobbling directions of the tracks of the optical disks opposite to each other. In such an arrangement, the wobbling direction at a leading portion of wobbling in the optical disk 101 having a configuration that information is recorded on a groove track lies on a radially inner side of the optical disk 101, whereas the wobbling direction at a leading portion of wobbling in the optical disk 107 having a configuration that information is recorded on a land track lies on the radially outer side of the optical disk 107. The term "leading portion of wobbling" means a leading portion of a series of wobbling patterns constituting certain data.

Next, the embodiment of the invention is described referring to FIG. 6. Denoted by the reference numeral 3001 in FIG. 6 is an enlarged illustration of a region 106 (see FIG. 1A) of a groove track in the control data area 102 in the track direction of the optical disk 101. Likewise, denoted by the reference numeral 3002 in FIG. 6 is an enlarged illustration of a region 112 (see FIG. 1B) of a land track in the control data area 108 in the track direction of the optical disk 107.

As shown in FIG. 6, the groove track in the control data area 102 of the optical disk 101, and the land track in the control data area 108 of the optical disk 107 are modulated, respectively.

The groove track in the control data area 102 of the optical disk 101 is modulated with use of two patterns, as shown by the wobbling pattern 3001. Specifically, in one of the two patterns, the polarity is not inverted in a basic cycle T2 of time, whereas in the other one of the two patterns, the polarity is inverted in a basic cycle T2 of time. The polarity is inverted in both of the two patterns every basic cycle T2 of time. The pattern in which the polarity is not inverted is defined as the value "0", and the pattern in which the polarity is inverted is defined as the value "1".

Likewise, the land track in the control data area 108 of the optical disk 107 is modulated with use of two patterns, as shown by the wobbling pattern 3002. Specifically, in one of the two patterns, the polarity is not inverted in a basic cycle T2 of time, whereas in the other one of the two patterns, the polarity is inverted in a basic cycle T2 of time. The polarity is inverted in both of the two patterns every basic cycle T2 of time. The pattern in which the polarity is not inverted is defined as the value "0", and the pattern in which the polarity is inverted is defined as the value "1".

In this arrangement, as far as a playback apparatus can detect a change of the polarity, the values "0" and "1" can be detected regardless of the polarity of the detected differential signal, and information such as administration data, address information, and a sync pattern, each of which is constituted of combination of the values "0" and "1" can be detected.

Figure 7:
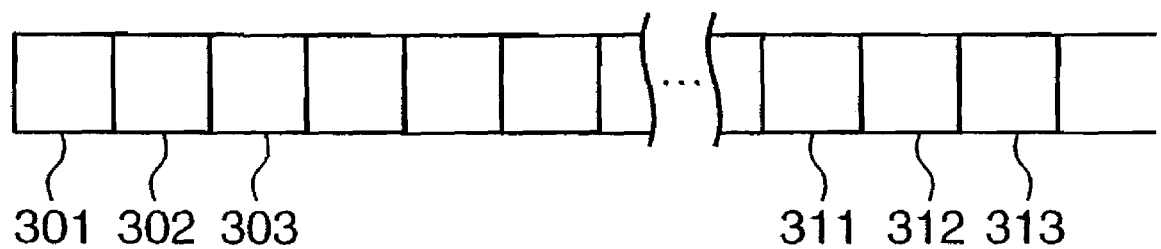
FIG. 7 is an illustration conceptually showing addresses.

As shown in FIG. 7., which is a conceptual illustration of addresses, for instance, these information are recorded by allowing the individual information to be stored in a predetermined address allocated in a track of the control data area 102 (108). For instance, information representing the type of the disk is recorded in the address 301, and information representing the storage capacity of the disk is recorded in the address 302. Various information including the aforementioned information are repeatedly recorded in plural addresses. For instance, the information representing the type of the disk is recorded in the address 311, as well as in the address 301, and the information representing the storage capacity of the disk is recorded in the address 312, as well as in the address 302.

A code is provided in the track of the control data area 102 (108) for indicating the groove track or the land track onto which tracking servo control is executed. The code is provided both in the control data area 102 of the optical disk 101, and in the control data area 108 of the optical disk 107. In the optical disk 101 (107), the code is recorded in the addresses 303 and 313, for instance. The code is identification information recorded in the optical disk 101 (107) in such a manner that an optical disk having a code of a value "0", for instance, represents an optical disk having a configuration that tracking servo control is executed onto the groove track, and that an optical disk having a code of a value "1", for instance, represents an optical disk having a configuration that tracking servo control is executed onto the land track. The playback apparatus embodying the invention is configured in such a manner that judgment as to whether tracking servo control is executed onto the land track or onto the groove track is made by reproducing the identification information recorded in the optical disk. The construction of the playback apparatus will be described later in detail.

Referring back to FIG. 6, let's assume that the same information is recorded on the groove track of the control data area 102 of the optical disk 101 and on the land track of the control data area 108 of the optical disk 107. Then, the direction of modulation of the groove track in the optical disk 101, and the direction of modulation of the land track in the optical disk 107 are different from each other by 180 degrees in phase. In other words, directions of starting modulation of the track are opposite to each other with respect to the playback direction between an information recording medium having a configuration that data is recorded on a groove track, and an information recording medium having a configuration that data is recorded on a land track. For instance, whereas the optical disk 101 having a configuration that data is recorded on a groove track has a feature that the direction of modulation in a modulation start portion of the track lies on a radially inner side of the optical disk 101, the optical disk 107 having a configuration that data is recorded on a land track has a feature that the direction of modulation in a modulation start portion of the track lies on the radially outer side of the optical disk 107. The term "modulation start portion" indicates a leading portion of a series of modulated track portions constituting certain data.

Differential signals to be detected are inverted between a case of emitting laser light onto a groove track, and a case of emitting laser light onto a land track. In view of this, by making the direction of modulation in the modulation start portion of the land track, and the direction of modulation in the modulation start portion of the groove track opposite to each other, the polarity of a differential signal to be detected in playback of data from the groove track in the control data area 102 of the optical disk 101, and the polarity of a differential signal to be detected in playback of data from the land track in the control data area 108 of the optical disk 107 can be made coincident with each other. In this arrangement, even with use of a recording apparatus which is merely compatible with an optical disk having a configuration that data is recorded in a groove track such as the optical disk 101, administration data and the like of an optical disk having a configuration that data is recorded in a land track such as the optical disk 107 can be detected in accordance with the same sequence as the optical disk 101, as far as tracking servo control is executable onto the land track.

In the foregoing embodiment of the invention, the groove track in the control data area 102, and the land track in the control data area 108 are modulated. Alternatively, the groove track in the control data area 102 and the land track in the control data area 108 may be wobbled, or the groove track in the control data area 102 and the land track in the control data area 108 may have asperities in a thickness direction of the optical disk 101 (107).

Further, as far as information detected from the groove track in the control data area 102 can be detected from the land track in the control data area 108 in the case where the same information is recorded in the groove track of the control data area 102 and in the land track of the control data area 108, the manner of changing the pattern of the track, and the manner of defining the values "0" and "1" are not specifically limited to the foregoing.

Figure 8:
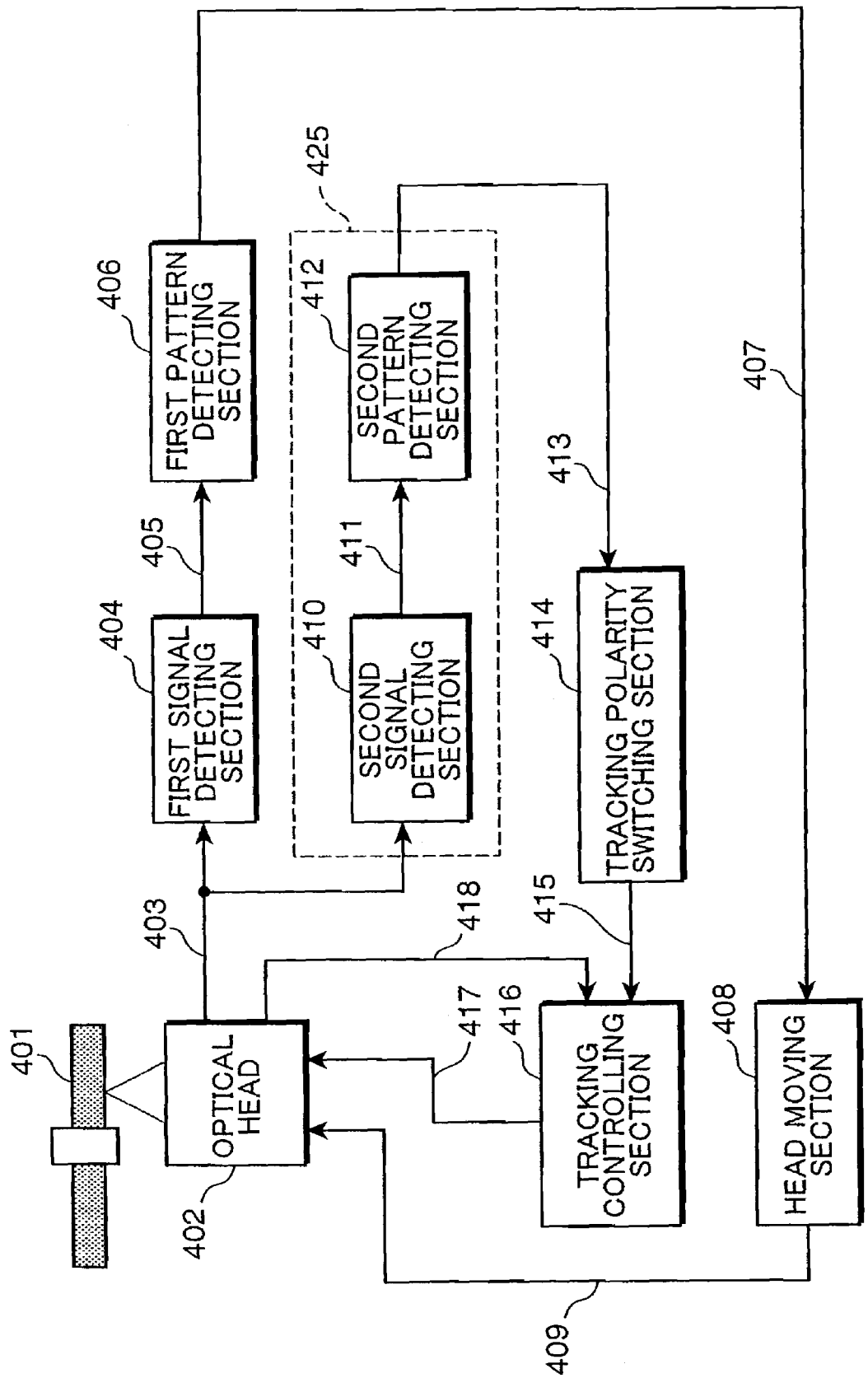
FIG. 8 is a block diagram of a recording/playback apparatus embodying the invention.

Next, the embodiment of the invention is described referring to FIG. 8. FIG. 8 is a block diagram schematically showing a recording/playback apparatus embodying the invention.

The recording/playback apparatus comprises an optical head 402, a first signal detecting section 404 serving as signal detecting means A, a first pattern detecting section 406 serving as pattern detecting means A, a head moving section 408 serving as head moving means, a code detecting section 425 serving as a code detector, a tracking polarity switching section 414 serving as a tracking polarity switcher, and a tracking controlling section 416 serving as a tracking servo controller. In the present specification, the recording/playback apparatus means an apparatus which performs at least one of recording of information into a land track or into a groove track of a recording layer of an information recording medium, and playback of information recorded in the land track or in the groove track.

The optical head 402 records information into the optical disk 401 or plays back information recorded on the optical disk 401 by emitting light onto an optical disk 401 or by receiving reflected light from the optical disk 401.

The code detecting section 425 controllably acquires information included in the code in response to tracking servo control based on a predetermined polarity, namely, a tracking polarity which represents a land track or a groove track. The code detecting section 425 functionally includes a second signal detecting section 410 serving as signal detecting means B, and a second pattern detecting section 412 serving as pattern detecting means B. The second signal detecting section 410 receives a differential signal 403 from the optical head 402 under the tracking servo control, and generates a binary signal 411 in response to a change of the polarity of the differential signal 403. The second pattern detecting section 412 discriminates the code based on the binary signal 411 sent from the second signal detecting section 410, and outputs a signal 413 based on the discriminated code.

The tracking polarity switching section 414 receives the signal 413 from the second pattern detecting section 412, and outputs a signal 415 indicative of whether the tracking polarity is to be switched over based on the signal 413.

In this section, a case is described in which the optical disk 107 having a configuration that data is recorded on a land track is adopted as the optical disk 401. The optical head 402 travels to a certain position in a radial direction on the optical disk 401 by the head moving section 408, and executes tracking servo control onto a groove track of the optical disk 401 by the tracking controlling section 416. In this embodiment, tracking servo control is executed onto a groove track for the first time when the optical disk 401 is loaded as an initial setting. Alternatively, tracking servo control may be executed onto a land track for the first time when the optical disk is loaded.

The tracking controlling section 416 executes tracking servo control by monitoring a signal 418 sent from the optical head 402. The signal 418 is a signal component in a low frequency band of a differential signal outputted from two light receiving areas of a photo-detector in the case where reflected light from the groove track in the optical disk 401 has been received on the photo-detector, wherein the two light receiving areas are obtained by dividing the light receiving plane of the photo-detector into two halved parts along an imaginary line parallel with a tangential line of the track direction.

The optical head 402 outputs, to the first signal detecting section 404, a differential signal 403 obtained based on reflected light from the groove track in the data recording area 109. The differential signal 403 indicates a difference in output signals from the two light receiving areas of the photo-detector in the case where reflected light from the groove track in the data recording area 109 is received on the photo-detector, wherein the two light receiving areas are obtained by dividing the light receiving plane of the photo-detector into two halved parts along the imaginary line parallel with the tangential line of the track direction.

Figure 9:
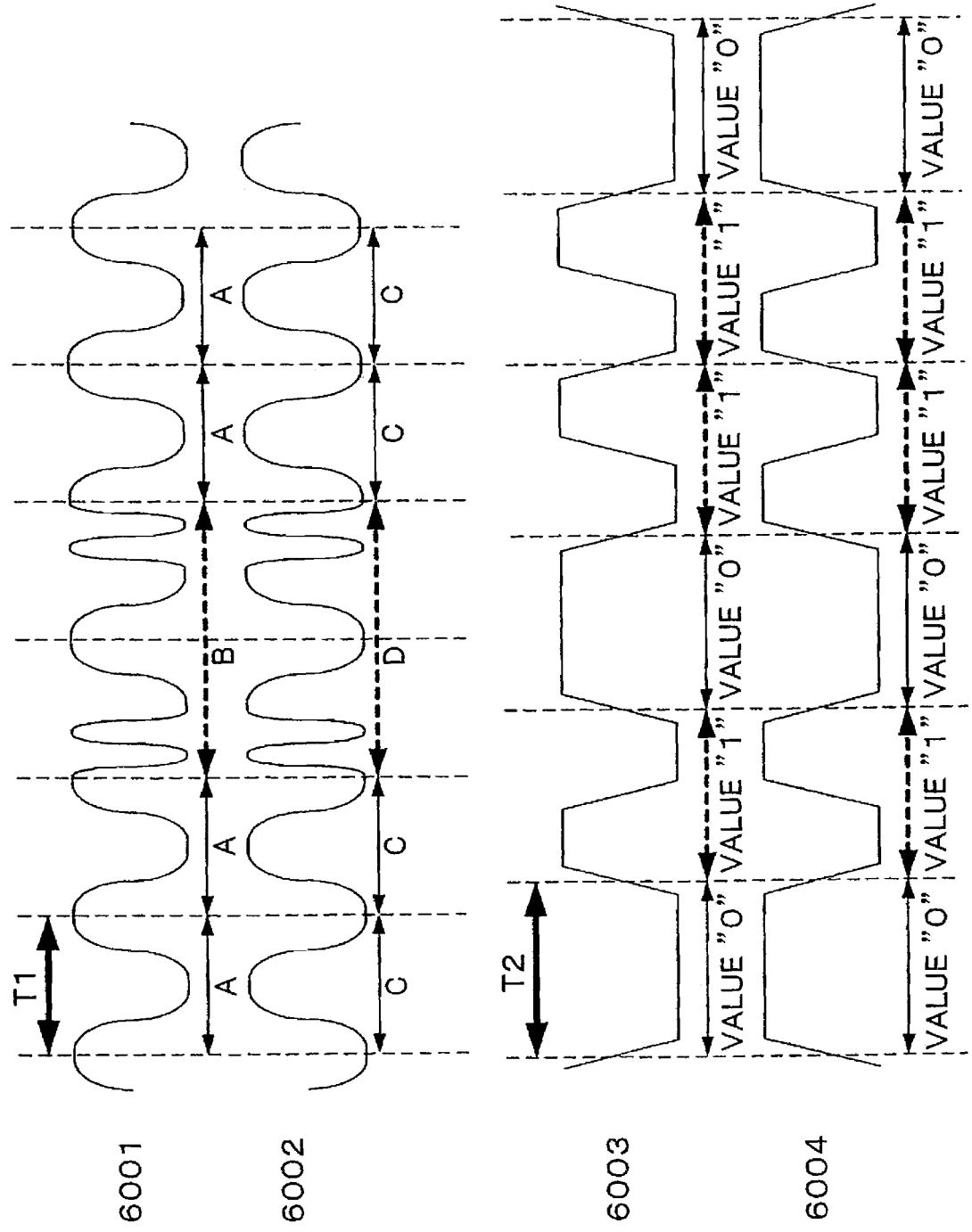
FIG. 9 is an illustration for explaining playback signals in the recording/playback apparatus of the invention.

Let's assume that a waveform as shown by the reference numeral 6002 in FIG. 9 is detected by the first signal detecting section 404 when the optical head 402 is driven to playback data from a land track in the data recording area 109. When tracking servo control is executed onto a groove track adjoining the land track, the first signal detecting section 404 detects a waveform 6001 as shown in FIG. 9 if a crosstalk effect from the other one of the land tracks adjoining the groove track is significantly small. The first signal detecting section 404 discriminates whether a detected pattern represents the value "0" or "1" based on a time lag between a timing of detecting a preceding pattern having the same frequency component as the pattern B, and a timing of detecting a succeeding pattern having the same frequency component as the pattern B. The first signal detecting section 404 generates a binary signal 405 representing a wobbling pattern based on the discriminated value "0" or "1", and outputs the binary signal 405 to the first pattern detecting section 406.

Upon receiving the binary signal 405, the first pattern detecting section 406 extracts an address component from the binary signal 405, and outputs the address component as a signal 407 to the head moving section 408. The head moving section 408 acquires a travel distance of the optical head 402 based on the signal 407 and on the current address, and outputs a signal 409 to move the optical head 402 to a designated position on the control data area 108 based on the travel distance.

The optical head 402, when moved to the designated position on the control data area 108, outputs, to the second signal detecting section 410, a differential signal 403 obtained based on the reflected light from the groove track in the optical disk 107. The differential signal 403 indicates a difference in output signals from the two light receiving areas of the photo-detector in the case where reflected light from the groove track in the control data area 108 is received on the photo-detector, wherein the two light receiving areas are obtained by dividing the light receiving plane of the photo-detector into two halved parts along the imaginary line parallel with the tangential line of the track direction.

Let's assume that a waveform indicated by the reference numeral 6004 in FIG. 9 is detected by the second signal detecting section 410 in the case where the optical head 402 is driven to playback data from a land track in the control data area 108. When tracking servo control is executed onto a groove track adjoining the land track, the second signal detecting section 410 detects a waveform 6003 as shown in FIG. 9 if a crosstalk effect from the other one of the land tracks adjoining the groove track is significantly small. The second signal detecting section 410 discriminates whether a detected pattern represents the value "0" or "1" by detecting a change in polarity of the differential signal 403. The second signal detecting section 410 generates a binary signal 411 based on the discriminated value "0" or "1", and outputs the binary signal 411 to the second pattern detecting section 412.

The second pattern detecting section 412 detects a code for determining the tracking polarity based on the binary signal 411, and outputs, to the tracking polarity switching section 414, a signal 413 indicating that the tracking polarity represents a land track.

The tracking polarity switching section 414 compares the signal 413 with the current tracking polarity. In this embodiment, the optical head 402 is designed to execute tracking servo control onto a groove track prior to a land track. Accordingly, in this state, the tracking polarity switching section 414 outputs, to the tracking controlling section 416, a signal 415 requesting changeover of the tracking polarity, so that tracking servo control be executed onto the land track. Upon receiving the signal 415, the tracking controlling section 416 outputs a signal 417 to change over the tracking servo control from the groove track to the land track, and executes tracking servo control onto the land track by monitoring the signal 418.

In this embodiment, the optical head 402 travels to the control data area 108 after detecting address information from the data recording area 109 one time. Alternatively, the optical head 402 may gradually travel to the control data area 108 while cyclically detecting address information from the data recording area 109, or may directly travel to the control data area 108 immediately after the optical disk is loaded.

Further alternatively, it is possible to reproduce the code again after changeover of the tracking polarity to confirm whether the currently detected tracking polarity is proper.

In this embodiment, the code is provided to judge whether tracking servo control is executed onto the groove track or onto the land track in the control data area. Alternatively, it is possible to provide a code having the same function as the above code in the track(s) constituting the data recording area in place of the above code or in addition to the above code. Providing the code in the data recording area contributes to increase of a detecting ratio of the code, because the code is provided in a relatively large area, as compared with the arrangement that the code is provided in the control data area, whereby playback operation is easily carried out.

Further, in this embodiment, the optical disk has a single recording layer. Alternatively, the optical disk may have plural recording layers. In such an altered arrangement, preferably, the code may be provided in each of the recording layers.

There is a case that recording conditions such as the intensity or the position of a recording pulse are recorded in the control data area. In such a case, it is desirable to provide the code for determining whether tracking servo control is executed onto the groove track or onto the land track at a forward position in a playback direction relative to the area where the recording conditions have been recorded. This arrangement enables to promptly determine the tracking polarity in the case where playback is exclusively required, thereby shortening the time required for starting the playback operation.

In this embodiment, a recordable optical disk has been described as an example of the inventive information recording medium. Alternatively, a rewritable optical disk may be an example of the inventive information recording medium.

In this embodiment, the first signal detecting section 404 discriminates the values "0" and "1" based on a time lag between a timing of detecting a preceding pattern having the same frequency component as the pattern B, and a timing of detecting a succeeding pattern having the same frequency component as the pattern B. Alternatively, it is possible to extract an output signal solely from one of the two light receiving areas of the photo-detector closer to the land track from which data is to be played back, as the signal 403, in place of using a differential signal, in the case where a crosstalk effect from an adjoining land track is significantly large, and it is difficult to detect a binary signal, address information, a sync pattern or the like within a predetermined time, or within a predetermined area, or within a predetermined retry processing.

Further, if it is difficult to detect a binary signal, address information, a sync pattern or the like within a predetermined time, or within a predetermined area, or within a predetermined retry processing in a case other than the case of code detection, it may be possible to allow the code detecting means to output a signal requesting changeover of the tracking polarity to the tracking polarity switching section 414. A code for clearly indicating the tracking polarity may be omitted in the optical disk if an arrangement other than the arrangement that the code is detected is adopted.

Further alternatively, it is possible to directly detect a change of a differential signal, and to allow the tracking polarity switching section 414 to receive a signal requesting changeover of the tracking polarity if the change is out of a predetermined range. In such an altered arrangement, since there is no need of detecting a code, a code for clearly indicating the tracking polarity may be omitted in the optical disk.

In this embodiment, the second signal detecting section 410 discriminates the values "0" and "1" based on a detection result on a change of the polarity of the differential signal 403. Alternatively, if a crosstalk effect from an adjoining land track is significantly large, and it is difficult to detect a binary signal, address information, a sync pattern or the like within a predetermined time, or within a predetermined playback area, or within a predetermined retry processing, it is possible to extract an output signal solely from one of the two light receiving areas of the photo-detector closer to the land track from which data is to be played back, as the signal 403, in place of using a differential signal.

Further alternatively, the code detecting section 425 may output a signal requesting changeover of the tracking polarity to the tracking polarity switching section 414 if it is difficult to detect a binary signal, address information, a sync pattern or the like within a predetermined time, or within a predetermined playback area, or within a predetermined retry processing. In such an altered arrangement, since there is no need of detecting a code, a code for clearly indicating the tracking polarity may be omitted in the optical disk.

Further alternatively, it is possible to directly detect a change of a differential signal, and to allow the code detecting section 425 to output, to the tracking polarity switching section 414, a signal requesting changeover of the tracking polarity if the change is out of a predetermined range. In such an altered arrangement, since there is no need of detecting a code, a code for clearly indicating the tracking polarity may be omitted in the optical disk.

Figure 10:
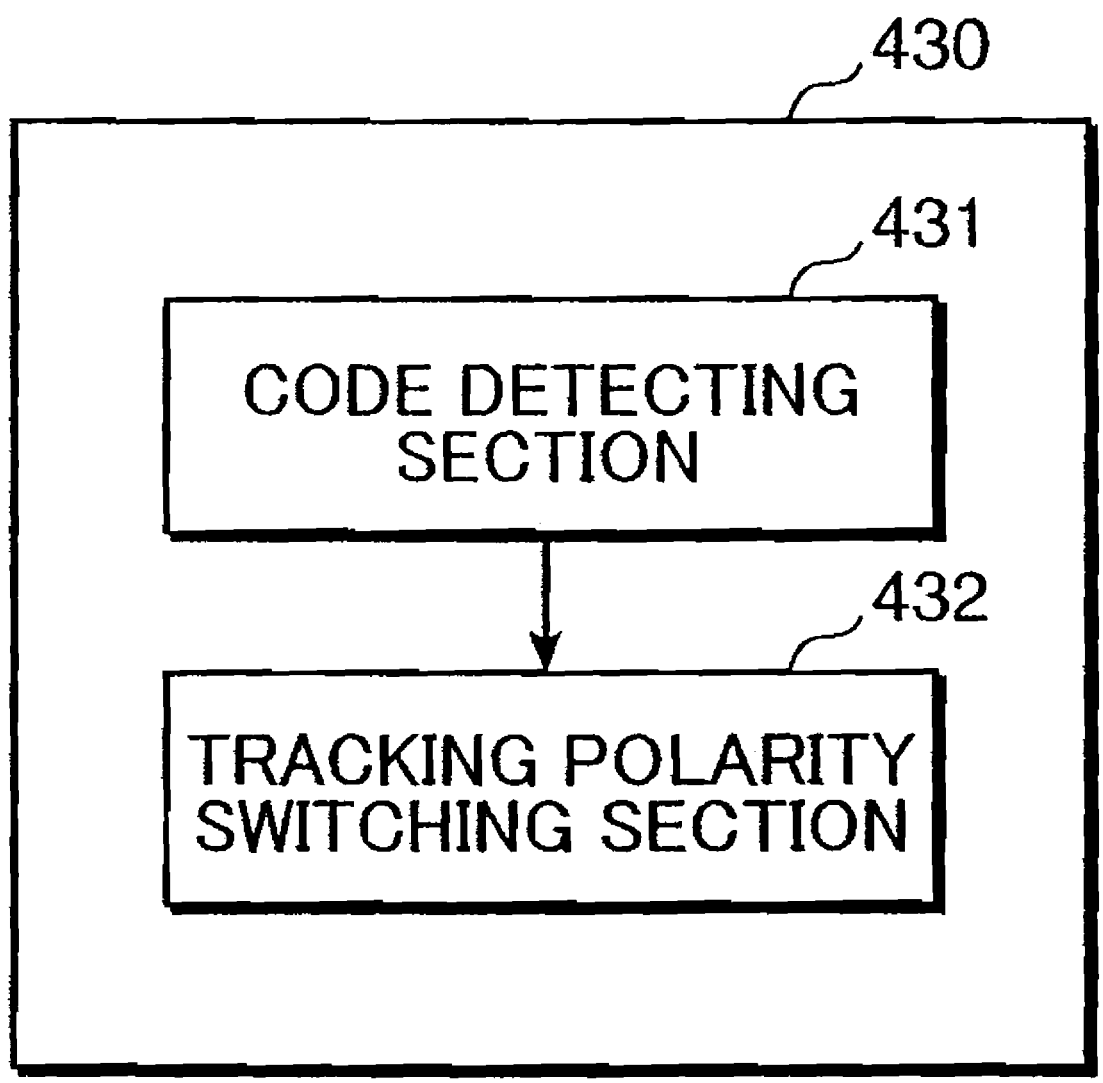
FIG. 10 is a block diagram of an integrated circuit embodying the invention.

In the foregoing, described is the arrangement that the information recording/playback apparatus has the code detecting section 425 and the tracking polarity switching section 414. As shown in FIG. 10, the information recording/playback apparatus may be configured in such a manner that an integrated circuit 430 functionally has a code detecting section 431 serving as code detecting means, and a tracking polarity switching section 432 serving as tracking polarity switching means. Further alternatively, a computer program may functionally have the code detecting section 431 and the tracking polarity switching section 432.

Figure 11:
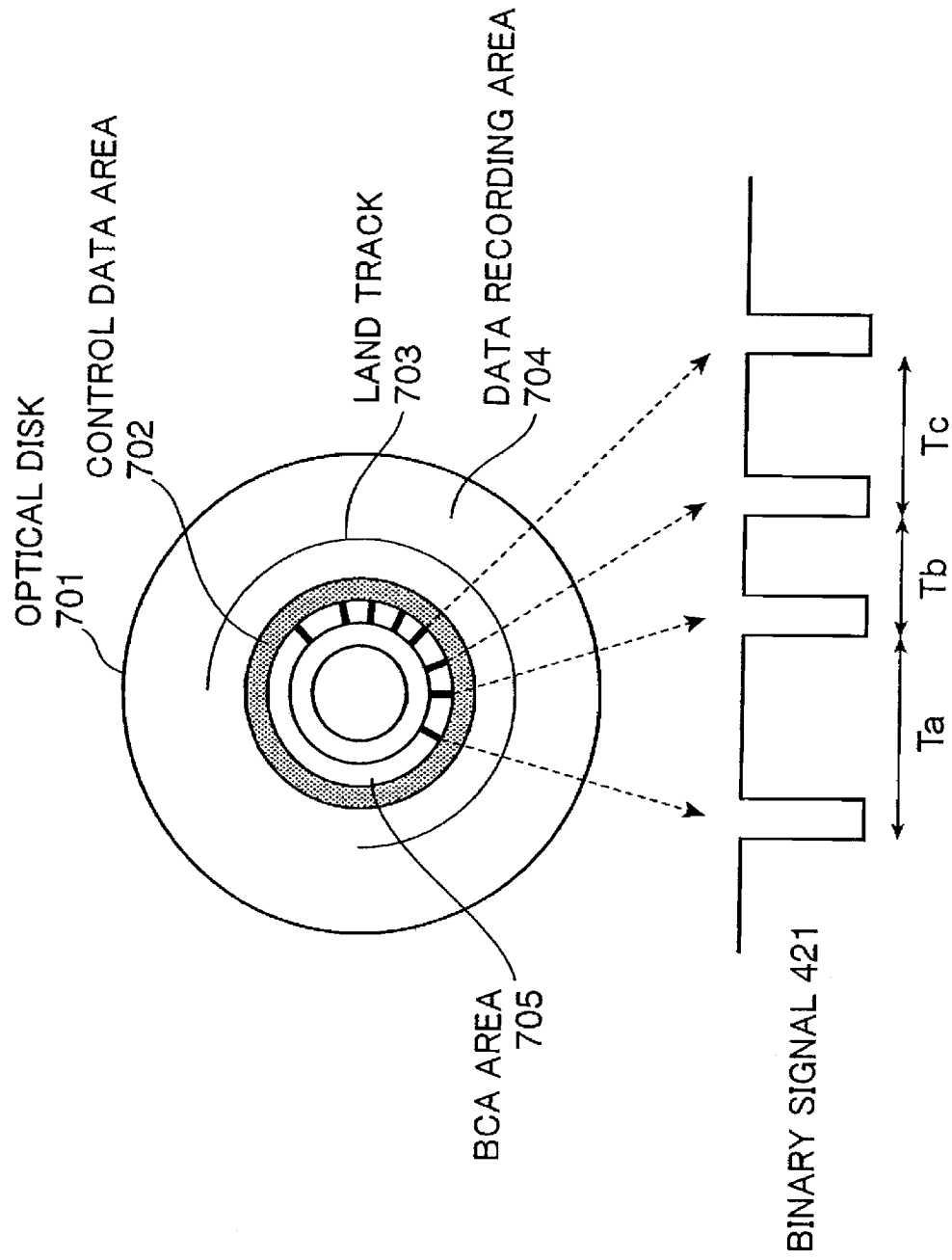
FIG. 11 is a plan view of an optical disk as another example of the information recording medium embodying the invention.

Next, another embodiment of the invention is described referring to FIG. 11. FIG. 11 shows an optical disk 701, as another example of the information recording medium embodying the invention. The optical disk 701 comprises a burst cutting area (BCA area) 705, a control data area 702, and a data recording area 704, which are arranged in a radially outward direction in this order. The control data area 702 is an area in which administration data and the like have been pre-recorded. The data recording area 704 is an area in which data is recorded by a user. The BCA area 705 is an area in which information for classifying the disk-related contents recorded in the control data area 702 into further details has been recorded. The information recording into the BCA area 705 is carried out by recording the information in the format of barcode in a factory after production of the optical disks. The information recording may be carried out in the same manner as information is recorded in the data recording area 704, or may be carried out by utilizing a property change of a layer. Further alternatively, the information recording may be carried out by partly removing a layer by trimming.

A code is recorded in the BCA area 705 to determine onto which track, namely, a groove track or a land track, tracking servo control is executed. For instance, the optical disk 701 is of a type, wherein information is recorded on a land track 703.

Figure 12:
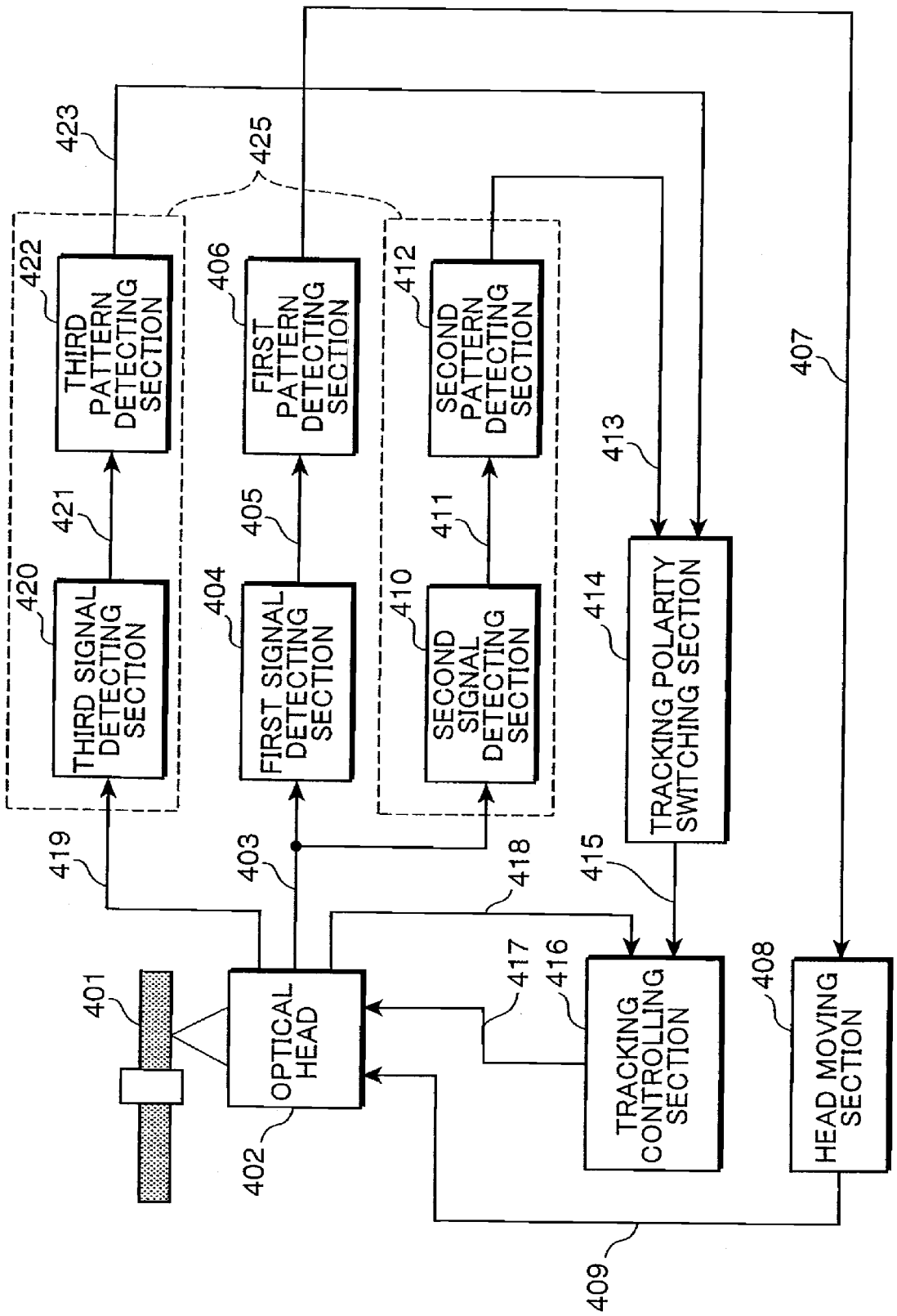
FIG. 12 is a block diagram of a recording/playback apparatus embodying the invention.
Figure 13A:
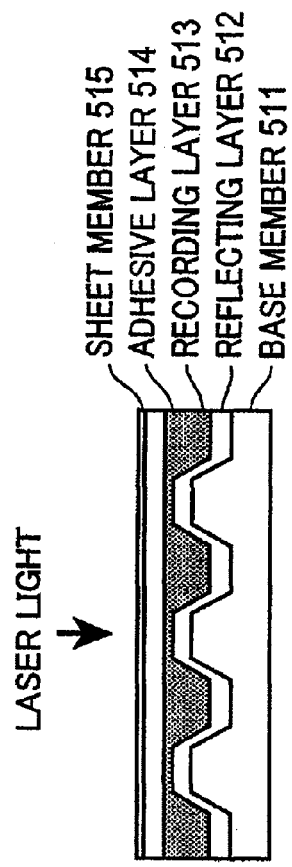
FIG. 13A is a cross-sectional view of a conventional optical disk produced by vapor deposition.
Figure 13C:
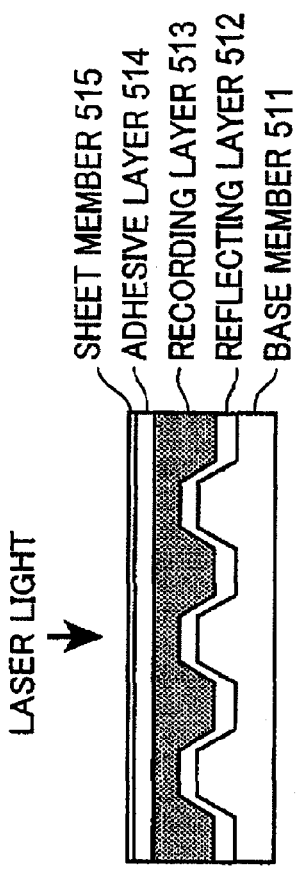
FIG. 13C is a cross-sectional view of an optical disk produced by spin-coating.
Figure 13B:
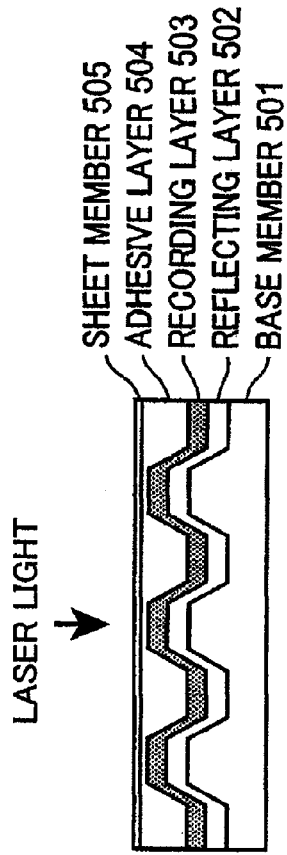
FIG. 13B is a cross-sectional view of a conventional optical disk produced by spin-coating.
Figure 13D:
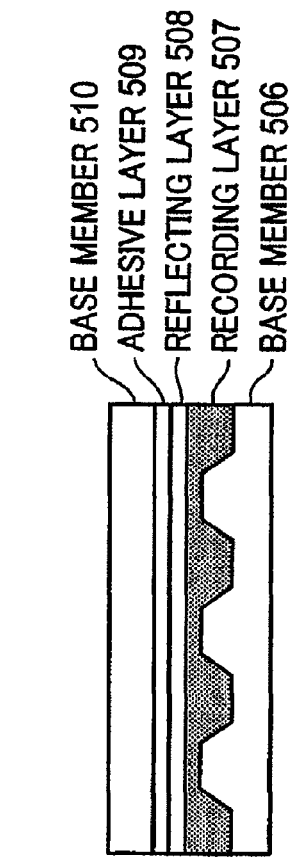
FIG. 13D is a cross-sectional view of an optical disk produced by spin-coating.

FIG. 12 is a block diagram of another recording/playback apparatus embodying the invention. The recording/playback apparatus shown in FIG. 12 can playback information recorded on the optical disk 701. Since the recording/playback apparatus shown in FIG. 12 has substantially a similar arrangement as that of the recording/playback apparatus shown in FIG. 8, merely parts of the recording/playback apparatus shown in FIG. 12 which are different from those of the recording/playback apparatus shown in FIG. 8 are described.

In the recording/playback apparatus shown in FIG. 12, a code detecting section 425 functionally has a third signal detecting section 420 serving as signal detecting means C, and a third pattern detecting section 422 serving as pattern detecting means C, in addition to a second signal detecting section 410 and a second pattern detecting section 412. The third signal detecting section 420 receives a sum signal 419 from an optical head 402 under focus servo control, and generates a binary signal 421 based on the sum signal 419. The sum signal represents a sum of output signals from two light receiving areas of a photo-detector in the case where reflected light from the BCA area 705 of the optical disk 701 has been received on the photo-detector, wherein the two light receiving areas are obtained by dividing the light receiving plane of the photo-detector into two halved parts along a line parallel with a tangential line of the track direction. Since information has been recorded in the format of barcode in the BCA area 705, the third signal detecting section 420 serving as the signal detecting means C generates the binary signal 421 based on an interval between bars of the barcode or the like.

Upon receiving the binary signal 421, the third pattern detecting section 422 discriminates the code based on the binary signal 421 outputted from the third signal detecting section 420, and outputs a signal 423 based on the discriminated code.

A tracking polarity switching section 414 receives the signal 423 from the third pattern detecting section 422, and outputs a signal indicating whether the tracking polarity is to be switched over based on the signal 423.

In this section, described is a case that the optical disk 701 having a configuration that information is recorded on a land track is loaded in the recording/playback apparatus. When the optical disk 701 is loaded, the optical head 402 travels to the BCA area 705 by a head moving section 408. Focus servo control is executed onto the BCA area 705 in this state by an unillustrated focus controlling section. When the focus servo control is executed, the optical head 402 receives reflected light from the BCA area 705, and outputs a sum signal 419 to the third signal detecting section 420 based on the reflected light. The third signal detecting section 420 reads the information recorded in the format of barcode, which is constituted based on a judgment as to whether a layer is formed or not, or based on a difference in layer property, and generates a binary signal 421 based on the result of reading. The binary signal 421 represents a value "0" or "1", which is a combination of a predetermined number of cycles of time. For instance, as shown in FIG. 11, a combination of cycles of time Ta, Tb, and Tc represents the value "0".

The binary signal 421 is outputted to the third pattern detecting section 422. The third pattern detecting section 422 retrieves the code based on the binary signal 421, and outputs, to the tracking polarity switching section 414, a signal 423 indicating that the tracking polarity represents a land track. Then, the tracking polarity switching section 414 outputs, to a tracking controlling section 416, a signal 415 requesting changeover of the tracking polarity, so that tracking servo control be executed onto the land track. Upon receiving the signal 415, the tracking controlling section 416 changes over the tracking servo control from the groove track to the land track, and executes tracking servo control onto the land track by monitoring a signal 418.

In the foregoing, described is the case that the code is provided in the control data area or in the BCA area. Alternatively, the code may be provided in either one of the areas constituting the optical disk, or may be provided in all the areas constituting the optical disk.

As mentioned above, according to the embodiments of the invention, the code for clearly indicating the tracking polarity representing the track from which data is to be played back is provided both in the optical disk having a configuration that information is recorded on a groove track, and in the optical disk having a configuration that information is recorded on a land track. In this arrangement, if the currently detected tracking polarity is not coincident with the polarity representing the track used for playback, the tracking polarity can be switched over by reproducing the code. This arrangement enables to keep the time required for startup of the apparatus from unduly increasing.

In the playback method in accordance with the embodiment of the invention, tracking servo control is executed according to the predetermined polarity, and the code for clearly indicating the polarity representing the track used for playback is reproduced. This arrangement enables to switch over the tracking polarity if the currently detected tracking polarity is not coincident with the polarity representing the track used for playback, thereby keeping the time required for startup of the apparatus from unduly increasing.

In the playback method in accordance with the embodiment of the invention, the tracking polarity can be switched over if it is difficult to detect a binary signal, address information, a sync pattern or the like within a predetermined time, or within a predetermined area, or within a predetermined retry processing in executing tracking servo control in accordance with the predetermined polarity. This arrangement enables to keep the time required for startup of the apparatus from unduly increasing.

BRIEF DESCRIPTION OF THE EMBODIMENTS

The embodiments of the invention are briefly described in the following.

(1) As mentioned above, in the embodiments, the code is provided in the control data area.

(2) The code may preferably be provided in the data recording area.

(3) The code may be provided in the BCA area if the information recording medium has the BCA area in which data for classifying the information recording medium is recorded.

(4) Preferably, the code may be provided in each of recording layers if the information recording medium has the plural recording layers. In such an arrangement, the code can be generated in playback of information recorded in any of the recording layers. This arrangement enables to keep the time required for startup of the recording/playback apparatus from unduly increasing in playback of information recorded in the information recording medium having the plural recording layers.

(5) Preferably, the code may be provided at such a position that the tracking servo control is executed prior to a code representing a recording condition.

(6) In the embodiments, the optical disk is of a recordable type.

(7) In the embodiments, the recording layer is formed by spin-coating, and information is recorded on the land track. The information recording medium having the above features is advantageous in shortening the time required for forming the recording layer, and in performing stable information recording while keeping the material cost of the information recording medium from unduly increasing.

(8) In the embodiments, the tracking polarity switcher switches over the tracking polarity if it is impossible to acquire the code in one of the conditions that an address information cannot be read, the code cannot be read, a sync pattern cannot be detected, and a binary signal extracted from a differential signal obtained by tracking servo control cannot be detected within a predetermined time, or within a predetermined area, or within a predetermined number of retries in executing the tracking servo control in accordance with a predetermined polarity. With this arrangement, the tracking servo control can be securely executed onto the track in which information is recorded.

(9) According to the embodiments of the invention, in a recording/playback apparatus for performing at least one of recording information onto a land track or onto a groove track of a recording layer of an information recording medium, and playback of information recorded on the land track or on the groove track, the apparatus comprises an optical head, tracking servo controller for executing tracking servo control onto the land track or onto the groove track in the information recording medium, and an integrated circuit.

(10) The tracking polarity may be switched over if it is impossible to acquire the code in one of the conditions that an address information cannot be read, the code cannot be read, a sync pattern cannot be detected, a binary signal extracted from a differential signal obtained by tracking servo control cannot be detected, and the differential signal obtained by the tracking servo control is out of a predetermined range in executing the tracking servo control in accordance with a predetermined polarity.

(11) According to the embodiments of the integrated circuit for executing tracking servo control onto an information recording medium having a land track and a groove track, the information recording medium may have a code for indicating the groove track or the land track onto which the tracking servo control is executed, and the integrated circuit comprises: code detector which controllably acquires the code in executing the tracking servo control in accordance with a predetermined polarity; and tracking polarity switcher which switches over a tracking polarity representing the land track or the groove track if the code detector judges it impossible to acquire the code within a predetermined time or within a predetermined number of retries.

In the above arrangement, since the tracking polarity is switched over based on a result of controllably acquiring the code, the tracking servo control can be promptly executed onto the track in which information has been recorded or is to be recorded. This arrangement enables to keep the time required for startup of the recording/playback apparatus from unduly increasing.

(12) According to the embodiments of the integrated circuit for executing tracking servo control onto an information recording medium having a land track and a groove track, the integrated circuit may comprise: tracking polarity switcher which switches over a tracking polarity representing the land track or the groove track in executing the tracking servo control in accordance with a predetermined polarity under one of the following conditions that: a differential signal obtained by the tracking servo control is out of a predetermined range; a binary signal cannot be detected based on the differential signal; and a sync pattern cannot be detected within a predetermined time, or within a predetermined area, or within a predetermined number of retries.

In the above arrangement, even if the information recording medium does not have a code for indicating the groove track or the land track onto which tracking servo control is executed, the tracking servo control can be promptly executed onto the track in which information has been recorded or is to be recorded. This arrangement enables to keep the time required for startup of the recording/playback apparatus from unduly increasing.

(13) According to the embodiments of the computer program (computer program product) for causing a computer to function as a tracking servo controller which executes tracking servo control onto an information recording medium having a land track and a groove track, the information recording medium may have a code for indicating the groove track or the land track onto which the tracking servo control is executed, and the computer program may comprise: code detector which controllably acquires the code in executing the tracking servo control in accordance with a predetermined polarity; and tracking polarity switcher which switches over a tracking polarity representing the land track or the groove track based on a detection result by the code detector.

In the above arrangement, since the tracking polarity is switched over based on a result of controllably acquiring the code, the tracking servo control can be promptly executed onto the track in which information has been recorded or is to be recorded. This arrangement enables to keep the time required for startup of the recording/playback apparatus from unduly increasing.

(14) According to the embodiments of the computer program for causing a computer to function as a tracking servo controller which executes tracking servo control onto an information recording medium having a land track and a groove track, the computer program may comprise: tracking polarity switcher which switches over a tracking polarity representing the land track or the groove track in executing the tracking servo control in accordance with a predetermined polarity under one of the following conditions that: a differential signal obtained by the tracking servo control is out of a predetermined range; a binary signal cannot be detected based on the differential signal; and a sync pattern cannot be detected within a predetermined time, or within a predetermined area, or within a predetermined number of retries.

(15) According to the embodiments of the information recording/playback method for implementing at least one of recording of information onto a land track or onto a groove track of a recording layer of an information recording medium, and playback of information recorded on the land track or on the groove track, the information recording medium may have a code for indicating the groove track or the land track onto which tracking servo control is executed, and the method may comprise: switching over a tracking polarity representing the land track or the groove track in executing the tracking servo control in accordance with a predetermined polarity if it is judged that the code cannot be acquired within a predetermined time or within a predetermined number of retries.

Since the above method comprises the step of switching over the tracking polarity, the tracking servo control can be promptly executed onto the track in which information has been recorded or is to be recorded. This arrangement enables to keep the time required for startup of the recording/playback apparatus from unduly increasing.

(16) According to the embodiments of the information recording/playback method for implementing at least one of recording of information onto a land track or onto a groove track of a recording layer of an information recording medium, and playback of information recorded on the land track or on the groove track, the method may comprise: switching over a tracking polarity representing the land track or the groove track in executing tracking servo control in accordance with a predetermined polarity under one of the following conditions that: a sync pattern cannot be detected; a binary signal cannot be detected based on a differential signal obtained by the tracking servo control; and the differential signal obtained by the tracking servo control is out of a predetermined range.

In the above arrangement, even if the information recording medium does not have a code for determining whether the tracking servo control is executed onto the land track or onto the groove track, the tracking servo control can be promptly executed onto the track in which information has been recorded or is to be recorded. This arrangement enables to keep the time required for startup of the recording/playback apparatus from unduly increasing.

(17) According to the embodiments of the information recording/playback method for implementing at least one of recording of information onto a land track or onto a groove track of a recording layer of an information recording medium, and playback of information recorded on the land track or on the groove track, the method may comprise: recording of information onto the information recording medium or playback of information recorded on the information recording medium is carried out in such a manner that directions of starting modulation of the track are opposite to each other with respect to a playback direction between the information recording medium having a configuration that tracking servo control is executed onto the land track, and the information recording medium having a configuration that the tracking servo control is executed onto the groove track.

According to the above method, the polarities of differential signals can be made coincident with each other between the information recording media, by utilizing optical characteristics of the information recording media. This arrangement enables to read addresses of the information recording media with use of the same sequence, thereby keeping the time required for startup of the recording/playback apparatus from unduly increasing.

(18) According to the embodiments of the information recording/playback method for implementing at least one of recording of information onto a land track or onto a groove track of a recording layer of an information recording medium, and playback of information recorded on the land track or on the groove track, the method may comprise: recording of information onto the information recording medium or playback of information recorded on the information recording medium is carried out in such a manner that directions of starting wobbling of the track are opposite to each other with respect to a playback direction between the information recording medium having a configuration that tracking servo control is executed onto the land track, and the information recording medium having a configuration that the tracking servo control is executed onto the groove track.

According to the above method, the polarities of differential signals can be made coincident with each other between the information recording media, by utilizing optical characteristics of the information recording media. This arrangement enables to read addresses of the information recording media with use of the same sequence, thereby keeping the time required for startup of the recording/playback apparatus from unduly increasing.

EXPLOITATION IN INDUSTRY

Since the present invention is useful in realizing prompt startup of recording/playback of information in or out of an optical disk, the invention is applicable to an information recording medium, an integrated circuit, a recording/playback apparatus, a computer program, and an information recording/playback method.

The invention claimed is:

1. A method of manufacturing an information recording medium having a recording layer which has a groove track and a land track, such that only one of the land track and the groove track is to be selected as an information recording track of the recording layer, such that information is to be recorded on only the selected one of the land track and the groove track of the recording layer, and such that the one of the land track and the groove track onto which the information is to be recorded has a wobbled portion having address information, wherein the information recording medium includes a data area onto which the information is to be recorded, and includes a control data area onto which a recording condition for the information recording medium is recorded, the control data area being concentrically located closer to a center of the information recording medium than the data area, wherein the wobbled portion includes a fundamental waveform signal having a fundamental frequency, and the wobbled portion includes a signal that is different from the fundamental frequency, wherein the signal that is different from the fundamental frequency is added to or subtracted from a part of the fundamental waveform signal, so as to add the address information to the wobbled portion, and wherein the method comprises:

selecting the information recording track of the recording layer from only one of the land track and the groove track, so that the information is only to be recorded onto the selected one of the land track and the groove track of the recording layer;

setting the wobbled portion of the information recording track, such that (i) a starting direction of a wobble of the groove track of the recording layer, when the selected information recording track is the groove track, and (ii) the starting direction of the wobble of the land track of the recording layer, when the selected information recording track is the land track, are reverse directions of one another with respect to a reproduction direction, even when same address information is recorded in the wobbled portion;

forming the wobbled portion of the selected information recording track according to the starting direction of the wobble of the set wobbled portion; and providing, in the control data area, a code indicating onto which of the groove track and the land track a tracking servo is executed, such that the code is provided at a forward position in the reproduction direction relative to an area of the control data area where the recording condition has been recorded.

2. A method for recording information onto and reproducing the information from an information recording medium having a recording layer which has a groove track and a land track, such that only one of the groove track and the land track is selected as an information recording track of the recording layer, such that the information is recorded onto only the selected one of the land track and the groove track of the recording layer, and such that the recorded information is reproduced from the one of the land track and the groove track onto which the information is recorded, wherein the information recording medium includes a data area onto which the information is to be recorded, and includes a control data area onto which a recording condition for the information recording medium is recorded, the control data area being concentrically located closer to a center of the information recording medium than the data area, wherein the one of the land track and the groove track onto which the information is recorded has a wobbled portion having address information, wherein the wobbled portion includes a fundamental waveform signal having a fundamental frequency, and the wobbled portion includes a signal that is different from the fundamental frequency, wherein the signal that is different from the fundamental frequency is added to or subtracted from a part of the fundamental waveform signal, so as to add the address information to the wobbled portion, wherein the one of the land track and the groove track onto which the information is recorded is identified as a selected information recording track of the recording layer, such that the selected information recording track of the recording layer is only one of the land track and the groove track, and such that the information is only recorded onto the selected one of the land track and the groove track identified as the selected information recording track of the recording layer, wherein the wobbled portion of the information recording track is set, such that (i) a starting direction of a wobble of the groove track of the recording layer, when the selected information recording track is the groove track, and (ii) the starting direction of the wobble of the land track of the recording layer, when the selected information recording track is the land track, are reverse directions of one another with respect to a reproduction direction, even when same address information is recorded in the wobbled portion, wherein the wobbled portion of the selected information recording track is formed according to the starting direction of the wobble of the set wobbled portion, wherein the information recording medium includes a code, in the control data area, indicating onto which of the groove track and the land track a tracking servo is executed, such that the code is provided at a forward position in the reproduction direction relative to an area of the control data area where the recording condition has been recorded, and wherein the method comprises:

reproducing the code; and based on the reproduced code, performing at least one of (i) recording the information only onto the one of the land track and the groove track selected as the selected information recording track, and (ii) reproducing the information only from the one of the land track and the groove track selected as the selected information recording track.

* * * * *